(12) United States Patent
Whaling et al.

(10) Patent No.: US 11,386,370 B2
(45) Date of Patent: Jul. 12, 2022

(54) FLEET MANAGEMENT SYSTEM

(71) Applicant: Honda Motor Co., Ltd., Tokyo (JP)

(72) Inventors: Jeremy Whaling, Carson, CA (US); Robert M. Uyeki, Torrance, CA (US); Ryan Douglas Roy Harty, Long Beach, CA (US); Sruthi Raju Nadimpalli, Long Beach, CA (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/515,775

(22) Filed: Jul. 18, 2019

(65) Prior Publication Data
US 2020/0074372 A1 Mar. 5, 2020

Related U.S. Application Data

(60) Provisional application No. 62/724,761, filed on Aug. 30, 2018.

(51) Int. Cl.
*G06Q 10/00* (2012.01)
*G06Q 10/06* (2012.01)
*G06Q 30/02* (2012.01)

(52) U.S. Cl.
CPC ... *G06Q 10/06315* (2013.01); *G06Q 30/0206* (2013.01)

(58) Field of Classification Search
None
See application file for complete search history.

(56) References Cited

U.S. PATENT DOCUMENTS

| 6,070,156 A | * | 5/2000 | Hartsell, Jr. | G07C 5/008 705/413 |
| 6,098,879 A | * | 8/2000 | Terranova | G07F 7/1008 235/380 |
| 6,390,151 B1 | * | 5/2002 | Christman | G06Q 50/06 705/413 |
| 7,181,409 B1 | | 2/2007 | Murakami et al. | |
| 7,248,018 B2 | * | 7/2007 | Sanders, Jr. | H02S 40/38 320/109 |

(Continued)

OTHER PUBLICATIONS

Lemke, R. (2016). Market introduction of hydrogen fuel (Order No. 27610407). Available from ProQuest Dissertations and Theses Professional. (Year: 2016).*

(Continued)

*Primary Examiner* — Gurkanwaljit Singh
(74) *Attorney, Agent, or Firm* — Stinson LLP

(57) ABSTRACT

A fleet management system includes a request component that receives one or more service requests and analyzes a first service request to identify a plurality of request parameters, a fuel component that identifies one or more fuel parameters associated with the fuel types, an evaluation component that analyzes a plurality of service parameters in light of the request parameters and the fuel parameters to determine a plurality of operating costs for managing the first service request, and a service component that analyzes the operating costs to select a first vehicle type corresponding to one of the operating costs for managing the first service request. The fleet management system enables a fleet of vehicles using a plurality of fuel types to be effectively and efficiently managed.

20 Claims, 5 Drawing Sheets

(56) References Cited

U.S. PATENT DOCUMENTS

| | | | | |
|---|---|---|---|---|
| 8,019,445 | B2* | 9/2011 | Marhoefer | H02J 15/008 700/291 |
| 8,294,420 | B2 | 10/2012 | Kocher | |
| 9,939,288 | B2* | 4/2018 | Shinde | G01C 21/3679 |
| 11,034,338 | B2* | 6/2021 | Lei | G06Q 10/0631 |
| 2001/0020198 | A1* | 9/2001 | Wilson | B67D 7/067 705/14.27 |
| 2004/0117195 | A1* | 6/2004 | Bodin | G06Q 30/0212 705/39 |
| 2004/0205032 | A1* | 10/2004 | Routtenberg | B60L 58/30 429/430 |
| 2005/0165511 | A1* | 7/2005 | Fairlie | H01M 8/0656 700/286 |
| 2005/0231157 | A1* | 10/2005 | Sanders | B60L 55/00 320/109 |
| 2006/0059023 | A1 | 3/2006 | Mashinsky | |
| 2007/0106543 | A1* | 5/2007 | Baughman | G06Q 10/06375 705/7.26 |
| 2007/0282495 | A1* | 12/2007 | Kempton | B60L 53/11 701/22 |
| 2008/0027772 | A1* | 1/2008 | Gernega | G06Q 10/04 705/7.26 |
| 2009/0048716 | A1* | 2/2009 | Marhoefer | H01M 8/065 700/297 |
| 2010/0191674 | A1* | 7/2010 | Condon | G06Q 50/06 705/413 |
| 2011/0288738 | A1* | 11/2011 | Donnelly | F02D 19/0647 701/99 |
| 2012/0007542 | A1* | 1/2012 | Jammer | H01M 10/465 320/109 |
| 2012/0277940 | A1* | 11/2012 | Kumar | B61L 27/16 701/19 |
| 2013/0112313 | A1* | 5/2013 | Donnelly | F17C 5/06 141/98 |
| 2015/0073933 | A1 | 3/2015 | Stieg et al. | |
| 2015/0168172 | A1* | 6/2015 | Roth | G01C 21/3679 701/123 |
| 2016/0247106 | A1 | 8/2016 | Dalloro et al. | |
| 2016/0364823 | A1* | 12/2016 | Cao | G01C 21/3438 |
| 2017/0108344 | A1* | 4/2017 | Shinde | G06Q 20/322 |
| 2017/0287237 | A1 | 10/2017 | Koenig et al. | |
| 2018/0099856 | A1* | 4/2018 | Dudar | B67D 7/0492 |
| 2018/0300823 | A1* | 10/2018 | Aubuchon | G06Q 20/322 |

OTHER PUBLICATIONS

Nault, B. R. (1995). Added value and pricing with information technology. MIS Quarterly, 19(4), 449. (Year: 1995).*

Pease, M. M. (2010). Planning for uncertainty: A comparative analysis of alternative fuels for freight shipping companies (Order No. 3448780). Available from ProQuest Dissertations and Theses Professional. (Year: 2010).*

Golob, Thomas F., et al. "A Vehicle Use Forecasting Model Based on Revealed and Stated Vehicle Type Choice and Utilisation Data." Journal of Transport Economics and Policy, 1997. (Year: 1997).*

Hess, Stephane, et al. "A Joint Model for Vehicle Type and Fuel Type Choice: Evidence from a Cross-Nested Logit Study." Transportation, vol. 39, No. 3, 2012, pp. 593-625. (Year: 2012).*

Adler, J. D. (2014). Routing and scheduling of electric and alternative-fuel vehicles (Order No. 3617951). Available from ProQuest Dissertations and Theses Professional. (1528555035). (Year: 2014).*

In, Joonhwan, and John E. Bell. "Alternative fuel infrastructure and customer location impacts on fleet mix and vehicle routing." Transportation Journal 54.4 (2015): 409-437. (Year: 2015).*

Golob, Thomas F., et al. "A Vehicle Use Forecasting Model Based on Revealed and Stated Vehicle Type Choice and Utilisation Data." Journal of Transport Economics and Policy, 1997. (Year: 1997) (Year: 1997).*

Hess, Stephane, et al. "A Joint Model for Vehicle Type and Fuel Type Choice: Evidence from a Cross-Nested Logit Study." Transportation, vol. 39, No. 3, 2012, pp. 593-625. (Year: 2012) (Year: 2012).*

Adler, J. D. (2014). Routing and scheduling of electric and alternative-fuel vehicles (Order No. 3617951). Available from ProQuest Dissertations and Theses Professional. (1528555035). (Year: 2014) (Year: 2014).*

In, Joonhwan, and John E. Bell. "Alternative fuel infrastructure and customer location impacts on fleet mix and vehicle routing." Transportation Journal 54.4 (2015): 409-437. (Year: 2015) (Year: 2015).*

Granovskii et al., Economic and environmental comparison of conventional, hybrid, electric and hydrogen fuel cell vehicles; Journal of Power Sources, vol. 159, 2006, pp. 1186-1193.

Kaa et al., The Battle between Battery and Fuel Cell Powered Electric Vehicles: A BWM Approach; Energies, 2019, 13-pages.

Kasim, T., Matchmaking between vehicle miles traveled and fuel economy: the role of gasoline prices; Department of Economics, Georgia State University; 47-pages.

* cited by examiner

FLEET MANAGEMENT SYSTEM

CROSS-REFERENCE TO RELATED APPLICATION

This application claims priority to U.S. Provisional Application Ser. No. 62/724,761, filed on Aug. 30, 2018, which is hereby incorporated by reference in its entirety.

BACKGROUND

A variety of technologies have been used to manage assets. Fleet management systems, for example, have allowed companies to manage a plurality of vehicles by monitoring their usage. Some known fleet management systems track vehicle status and location to dispatch vehicles based on their proximity to targets. Managing a plurality of assets using conventional fleet management systems, however, may be tedious, time consuming, and/or expensive, particularly when there is a large quantity of assets to track. Moreover, at least some known fleet management systems are relatively simple and have limited capabilities.

SUMMARY

Examples of the disclosure enable a plurality of vehicles using a plurality of fuel types to be managed. In one aspect, a fleet management system includes a request component that receives one or more service requests and analyzes a first service request to identify a plurality of request parameters, a fuel component that identifies one or more fuel parameters associated with the fuel types, an evaluation component that analyzes a plurality of service parameters in light of the request parameters and the fuel parameters to determine a plurality of operating costs for managing the first service request, and a service component that analyzes the operating costs to select a first vehicle type corresponding to one of the operating costs for managing the first service request. The operating costs are associated with the fuel types, the first vehicle type is associated with a first fuel type, and the service parameters include a service territory and a fueling time.

In another aspect, a method is provided for managing a plurality of vehicles using a plurality of fuel types. The method includes receiving a service request, identifying a plurality of request parameters associated with the service request, determining a plurality of operating costs for managing the service request based on the request parameters, a plurality of service parameters, and one or more fuel parameters associated with the fuel types, and selecting a first vehicle type corresponding to one of the operating costs. The operating costs are associated with the fuel types, the first vehicle type is associated with a first fuel type, and the service parameters include a service territory and a fueling time.

In yet another aspect, a computing system is provided for use in managing a plurality of vehicles using a plurality of fuel types. The computing system includes one or more computer storage media including data associated with the plurality of vehicles and one or more filling stations, and computer-executable instructions, and one or more processors. The processors execute the computer-executable instructions to identify a plurality of request parameters associated with a service request, determine a plurality of operating costs based on the request parameters, a plurality of service parameters, and one or more fuel parameters associated with the fuel types, and select a first vehicle type corresponding to one of the operating costs. The operating costs are associated with the fuel types, the first vehicle type is associated with a first fuel type, and the service parameters include a service territory and a fueling time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
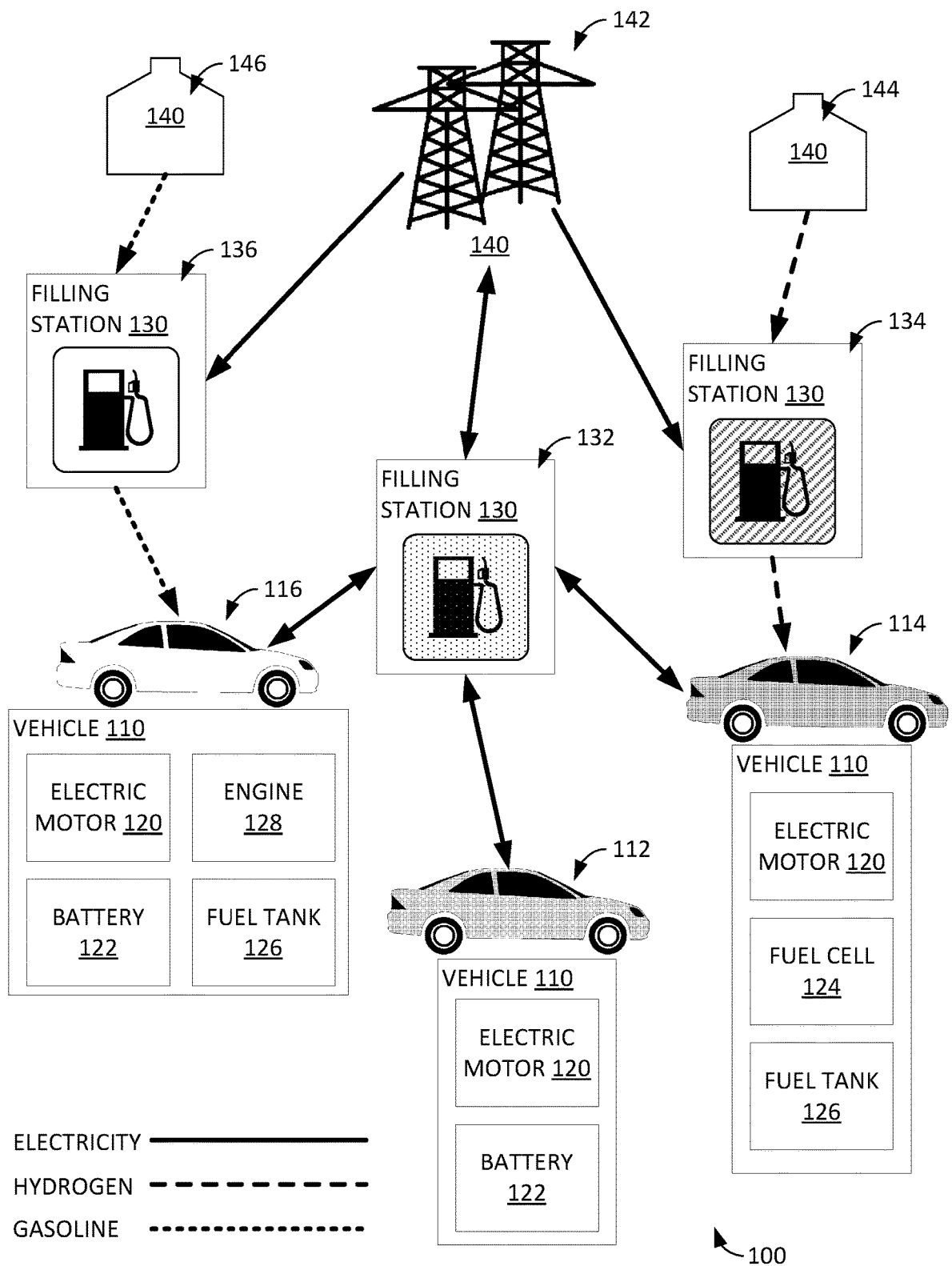
FIG. 1 includes a block diagram of an example environment including a fleet of vehicles that use various types of fuel.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to asset management systems and, more particularly, to systems and methods for managing a fleet of vehicles using a plurality of fuel types. Examples described herein include a fleet management system that identifies a plurality of request parameters associated with a service request, and uses the request parameters, a plurality of service parameters, and one or more fuel parameters associated with the fuel types to determine a plurality of operating costs for managing the service request. The operating costs are compared with each other, and one is selected based on the request parameters, service parameters, and/or fuel parameters. A first vehicle type corresponding to the selected operating cost is selected for servicing the service request. The first vehicle type is associated with one of the fuel types. The examples described herein enable a fleet of vehicles to be effectively and efficiently managed. While the examples described herein are described with respect to the management of vehicles based on desired user experiences, emission characteristics, and types of fuel, one of ordinary skill in the art would understand and appreciate that the example systems and methods may be used to manage any asset in any environment based on a variety of factors.

FIG. 1 shows an example environment 100 including a plurality of vehicles 110. The vehicles 110 may be managed in groups or types, for example, based on emission characteristics. In some examples, a first vehicle type includes a first vehicle 112 using a first type of fuel (or combination of fuels), a second vehicle type includes a second vehicle 114 using a second type of fuel (or combination of fuels), and a third vehicle type includes a third vehicle 116 using a third type of fuel (or combination of fuels).

In some examples, one or more vehicles 110 are electric vehicles (EVs) including electric motors 120 that convert electrical energy or electricity into mechanical power. The electric motors 120 may generate mechanical power to move or propel the vehicles 110 (e.g., via a drivetrain). Each electric motor 120 may be powered by a respective onboard battery pack including one or more batteries 122 and/or by a respective onboard fuel-cell stack including one or more fuel cells 124. For example, as shown in FIG. 1, the first vehicle 112 may use energy stored in batteries 122 to power its electric motor 120, and/or the second vehicle 114 may use electricity generated by fuel cells 124 to power its electric motor 120.

Fuel may be channeled to the fuel cells 124 from an onboard fuel tank 126. Additionally or alternatively, fuel from the fuel tank 126 may be channeled to an internal combustion engine 128 that burns fuel. The internal combustion engine 128 may ignite or combust the fuel using a spark plug (e.g., in a gasoline engine) or using mechanical or adiabatic compression (e.g., in a diesel engine). Example fuels that may be stored in the fuel tank 126 (e.g., for use with fuel cells 124 and/or internal combustion engine 128) include gasoline, diesel, hydrogen, natural gas, biodiesel, ethanol, and propane.

The internal combustion engine 128 may generate mechanical power, for example, to generate electricity (e.g., for powering the electric motor 120) and/or to move or propel the vehicle 110 (e.g., via a drivetrain). In this manner, the vehicles 110 may be moved or propelled from mechanical power generated using an electric motor 120 and/or an internal combustion engine 128. As shown in FIG. 1, the first vehicle 112 may be a battery electric vehicle (BEV) powered from energy stored in batteries 122, the second vehicle 114 may be a fuel cell electric vehicle (FCEV) powered from electrochemical reactions in fuel cells 124, and/or the third vehicle 116 may be a hybrid electric vehicle (HEV) powered from combustions in the internal combustion engine 128. While the environment 100 is described and shown to include the first vehicle 112, second vehicle 114, and third vehicle 116, one of ordinary skill in the art would understand and appreciate that the environment 100 described herein may include any quantity of vehicles 110 that use any type of fuel (or combination of fuels).

The environment 100 includes a plurality of filling stations 130. Each filling station 130 is associated with one or more respective types of fuel. For example, a first filling station 132 may be a charging station that is associated with electricity, a second filling station 134 may be a hydrogen station that is associated with hydrogen, and/or a third filling station 136 may be a gas station that is associated with gasoline and/or diesel. The filling stations 130 include a plurality of user interfaces and/or instrumentation (not shown) that facilitate use and handling. Charging stations (e.g., first filling station 132) include plugs, sockets, and/or chargers, such as a standard electrical socket, a high-capacity appliance socket, a dedicated EV socket, an external charger, and/or an inductive charging mat, that enable batteries 122 to be charged. And filling stations 130 other than charging stations (e.g., second filling station 134, third filling station 136) include fuel dispensers that enable fuel tanks 126 to be filled. As shown in FIG. 1, the first vehicle 112, second vehicle 114, and/or third vehicle 116 may charge its batteries 122 at the first filling station 132; the second vehicle 114 may fill its fuel tank 126 (e.g., with hydrogen) at the second filling station 134; and/or the third vehicle 116 may fill its fuel tank 126 (e.g., with gasoline or diesel) at the third filling station 136.

The filling stations 130 may be coupled to a plurality of fuel sources 140. Each fuel source 140 is associated with a respective type of fuel. For example, a first fuel source 142 in fluid communication with the first filling station 132 may be a power grid that is associated with electricity, a second fuel source 144 in fluid communication with the second filling station 134 may be a pipeline or tank that is associated with hydrogen, and/or a third fuel source 146 in fluid communication with the third filling station 136 may be a pipeline or tank that is associated with gasoline or diesel. As shown in FIG. 1, the first vehicle 112, second vehicle 114, and/or third vehicle 116 may use the first filling station 132 to draw electricity from the first fuel source 142; the second vehicle 114 may use the second filling station 134 to draw hydrogen from the second fuel source 144; and/or the third vehicle 116 may use the third filling station 136 to draw gasoline or diesel from the third fuel source 146.

In addition to allowing electricity to be drawn from the power grid (e.g., first fuel source 142), at least some charging stations (e.g., first filling station 132) may allow one or more vehicles 110 (e.g., first vehicle 112, second vehicle 114, third vehicle 116) to feed electricity into the power grid. For example, the first vehicle 112 and/or third vehicle 116 may discharge its batteries 122 at the first filling station 132, and/or the second vehicle 114 may provide or supply electricity generated by its fuel cells 124 to the first fuel source 142 via the first filling station 132. Example vehicles 110 that may feed electricity into the power grid include BEVs, FCEVs, plug-in hybrid electric vehicles (PHEVs), and plug-in electric vehicles (PEVs).

Figure 2:
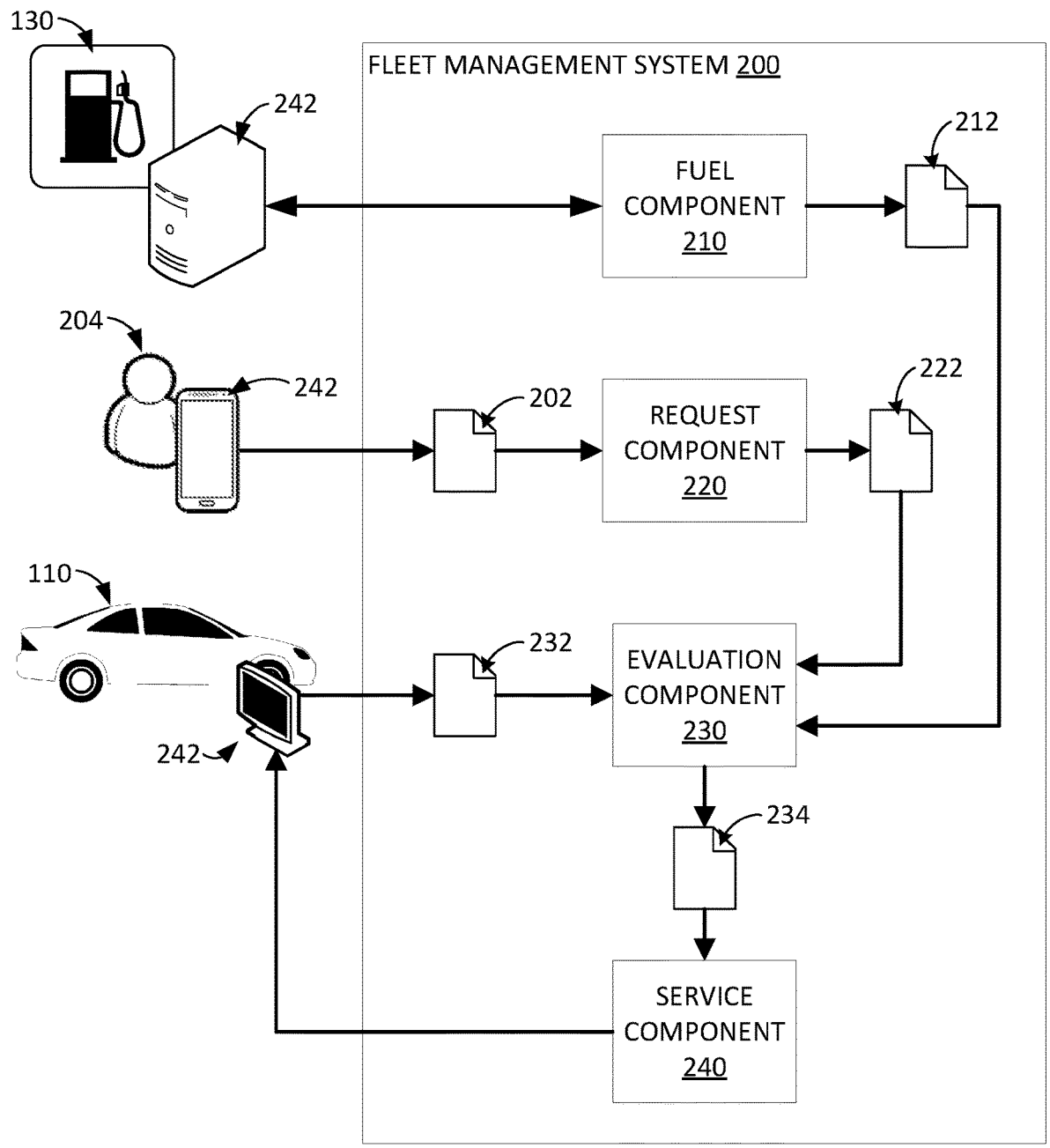
FIG. 2 includes a block diagram of an example fleet management system that may be used to manage a fleet of vehicles, such as the vehicles shown in FIG. 1.

FIG. 2 shows an example fleet management system 200 that may be used to manage the vehicles 110. The fleet management system 200 may process, for example, one or more service requests 202 associated with one or more service requesters 204 to enable the vehicles 110 to perform one or more services (e.g., for the service requesters 204). In some examples, the fleet management system 200 directs and/or operates the vehicles 110 to manage and/or undertake the service requests 202 in an efficient and effective manner.

The fleet management system 200 includes a fuel component 210 that is configured to identify one or more fuel parameters 212 associated with a plurality of fuel types. The fuel component 210 may identify the fuel parameters 212 by communicating, for example, with one or more filling stations 130. Example fuel parameters 212 include, without limitation, a fuel price (per unit), a filling station location, and a time. In some examples, the fuel component 210 monitors the fuel parameters 212 over a period of time to determine or identify one or more trends or patterns in the fuel parameters 212. In this manner, the vehicles 110 may be directed and/or operated to charge batteries 122 and/or fill fuel tanks 126 when and/or where the fuel price is relatively low, and/or to feed electricity into the power grid (e.g., first fuel source 142) when and/or where the fuel price is relatively high.

The fleet management system 200 includes a request component 220 configured to receive one or more service requests 202. The request component 220 may receive a service request 202 (e.g., a first service request) by communicating, for example, with a service requester 204. The request component 220 analyzes the service requests 202 to recognize or identify a plurality of request parameters 222 associated with the service requests 202. Example request parameters 222 include, without limitation, a service time (e.g., a time the service request 202 was submitted, a pick-up time, a drop-off time, a driving time, a service duration), a service location (e.g., a location of the service requester 204, a pick-up location, a drop-off location, a driving route), and a service type (e.g., a type of the service requested).

The fleet management system 200 includes an evaluation component 230 configured to analyze a plurality of service parameters 232 to generate or determine a plurality of operating costs 234 associated with managing the service request 202. An operating cost 234 may be determined, for example, for each vehicle type and/or for each vehicle 110. The evaluation component 230 may identify the service parameters 232 by communicating, for example, with one or more vehicles 110. Example service parameters 232 include, without limitation, a vehicle status, a vehicle location, a service territory, a fuel level, a fuel efficiency, a vehicle range (e.g., fuel level times fuel efficiency), and/or a traffic condition.

In some examples, the evaluation component 230 analyzes the service parameters 232 and/or determines the operating costs 234 in light of the request parameters 222 (e.g., service time, service location, service type). In this manner, the service request 202 may be managed based on a combination of requester-oriented factors (e.g., request parameters 222) and provider-oriented factors (e.g., service parameters 232). For example, the evaluation component 230 may determine operating costs 234 for a first service request 202 based on service demand and/or vehicle supply. Higher service demands and/or lower vehicle supplies may yield a higher operating cost 234; conversely, lower service demands and/or higher vehicle supplies may yield a lower operating cost 234.

In some examples, the evaluation component 230 determines service demand associated with a first service request 202 by identifying a quantity of service requests 202 associated with request parameters 222 that are the same as or similar to those of the first service request 202. Larger quantities of service requests 202 associated with service times, service locations, and/or services types that are comparable to the those of the first service request 202 may yield a greater service demand; conversely, smaller quantities of service requests 202 associated with service times, service locations, and/or services types that are comparable to the those of the first service request 202 may yield a lesser service demand.

Additionally or alternatively, service demand and/or vehicle supply may be determined by identifying a quantity or proportion of vehicles 110 that are occupied and/or available, respectively, at the service time and/or service location of the first service request 202. A vehicle 110 may be deemed occupied, for example, when it is assigned to a pending or active service request 202 (e.g., dispatched to service the service request 202, actively servicing the service request 202) and/or when it is off duty or out of service (e.g., for maintenance). On the other hand, a vehicle 110 may be deemed available when it is not occupied (e.g., when it is on duty and not assigned to a pending or active service request 202). Smaller quantities of occupied vehicles 110 and/or larger quantities of available vehicles 110 at the service time and/or service location of the first service request 202 may yield a lesser service demand and/or greater vehicle supply; conversely, larger quantities of occupied vehicles 110 and/or smaller quantities of available vehicles 110 at the service time and/or service location of the first service request 202 may yield a greater service demand. In some examples, the evaluation component 230 determines occupancy and/or availability of a vehicle 110 by identifying, for each vehicle 110, a projected service duration based on request parameters 222 (e.g., drop-off time and location) and/or service parameters 232 (e.g., vehicle location, fuel level, traffic conditions).

The evaluation component 230 may determine and/or adjust one or more service parameters 232 and/or operating costs 234 in light of the fuel parameters 212 (e.g., fuel price, filling station location, time). In this manner, the service request 202 may be managed based on resource-oriented factors (e.g., fuel parameters 212). For example, the evaluation component 230 may determine and/or adjust the occupancy and/or availability of a vehicle 110 based on a projected fueling duration. The fueling duration may be determined based on a route or travel distance between locations (e.g., vehicle location and filling station location, service location and filling station location) and traffic conditions. In some examples, the evaluation component 230 increases the projected service duration by the projected fueling duration (including any additional driving time).

The evaluation component 230 may define, for one or more vehicles 110 and/or service requests 202, a service territory based on a vehicle location, one or more service locations (e.g., pick-up location, drop-off location, driving route), and/or traffic conditions. In some examples, the evaluation component 230 determines whether a fuel level and/or vehicle range associated with a vehicle 110 is less than a predetermined threshold, and determines a fueling time (e.g., before pick-up time, between pick-up time and drop-off time, after drop-off time) and/or a fueling location (e.g., filling station location) in the service territory if the fuel level and/or vehicle range is less than the predetermined threshold. Additionally or alternatively, if the fuel level and/or vehicle range is greater than or at the predetermined threshold, the evaluation component 230 may determine a fueling time and/or fueling location for when the fuel level and/or vehicle range is projected to be less than the predetermined threshold. In some examples, the evaluation component 230 identifies one or more potential filling stations 130 in and/or adjacent to the service territory (e.g., based on a route or travel distance between locations), and selects, from the potential filling stations 130, a filling station 130 for fueling the vehicle 110 at the fueling time based on fuel parameters 212 (e.g., fuel price, filling station location), request parameters 222 (e.g., pick-up time and/or location, drop-off time and/or location, driving route), service parameters 232 (e.g., vehicle location, fuel level, traffic conditions), and/or operating costs 234.

The fleet management system 200 includes an service component 240 configured to analyze operating costs 234 associated with the vehicle types to select a first vehicle type for performing one or more operations in accordance with the service request 202. The first vehicle type may be selected, for example, to coordinate servicing and fueling decisions and/or operations for the fleet of vehicles 110. In some examples, the service component 240 analyzes operating costs 234 associated with the vehicles 110 to select a vehicle 110 associated with the first vehicle type for servicing the service request 202. The service component 240 may communicate with the selected vehicle 110, for example, to transmit or provide one or more instructions and/or directions for use in performing one or more operations in accordance with the service request 202.

In some examples, the fleet management system 200 includes one or more receivers, transmitters, and/or transceivers that enable the fleet management system 200 and its components (e.g., fuel component 210, request component 220, evaluation component 230, service component 240) to communicate with one or more remote devices 242 (e.g., at vehicles 110, filling stations 130, and/or service requesters 204). The fuel component 210, request component 220, evaluation component 230, and/or service component 240 may communicate using one or more communication protocols. Example communication protocols include, without limitation, a BLUETOOTH® brand communication protocol, a ZIGBEE® brand communication protocol, a Z-WAVE™ brand communication protocol, a WI-FI® brand communication protocol, a near field communication (NFC) communication protocol, a radio-frequency identification (RFID) communication protocol, and a cellular data communication protocol (BLUETOOTH® is a registered trademark of Bluetooth Special Interest Group ZIGBEE® is a registered trademark of ZigBee Alliance Corporation, and Z-WAVE™ is a trademark of Sigma Designs, Inc. WI-FI® is a registered trademark of the Wi-Fi Alliance.).

Figure 3:
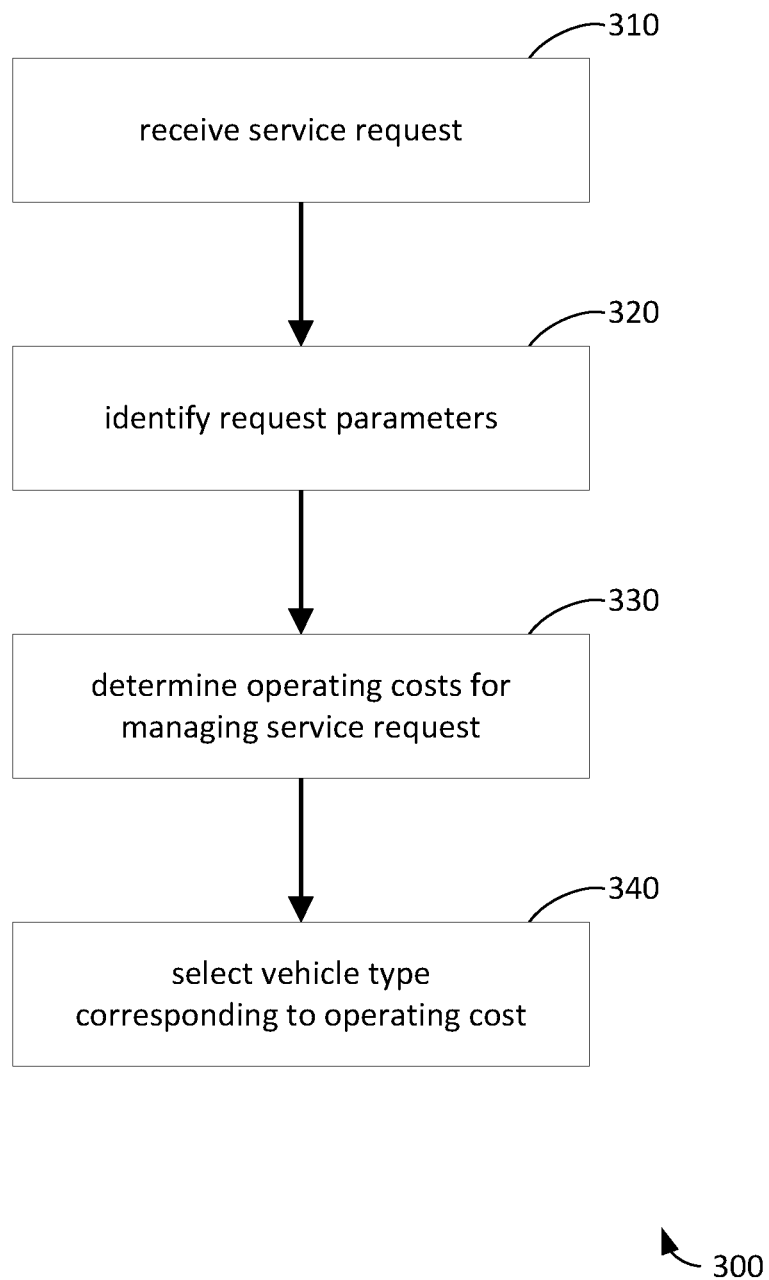
FIG. 3 includes a flowchart of an example method of managing a fleet using a system, such as the fleet management system shown in FIG. 2.

FIG. 3 shows an example method 300 of managing a fleet of vehicles 110 (shown in FIG. 1) using a fleet management system 200 (shown in FIG. 2). In some examples, a service request 202 is received at operation 310. A service requester 204, for example, may submit a service request 202 using a remote device 242. The service request 202 is analyzed to identify a plurality of request parameters 222 associated with the service request 202 at operation 320, and a plurality of operating costs 234 are determined at operation 330 for managing the service request 202 based on the request parameters 222, a plurality of service parameters 232, and one or more fuel parameters 212. The operating costs 234 may be associated with the fuel types. For example, an operating cost 234 may be determined for each vehicle type corresponding to a fuel type.

A variety of factors may be used to determine the operating costs 234. Example factors include, without limitation, service times (e.g., a pick-up time associated with the service request 202, a drop-off time associated with the service request 202, a projected duration between the pick-up time and the drop-off time), service locations (e.g., a pick-up location associated with the service request 202, a drop-off location associated with the service request 202, a projected route or travel distance between the pick-up location and the drop-off location), service types (e.g., a nature or characteristic of the requested service associated with the service request 202), service demand (e.g., quantity of similar service requests 202), vehicle supply (e.g., quantity of vehicles 110 available to service the service request 202), fuel levels, fuel efficiencies, vehicle ranges, fuel prices, filling station locations, and traffic conditions.

Service demand and/or vehicle supply in a service territory may be determined based on one or more request parameters 222 associated with the service request 202. For example, one or more available vehicles 110 in the service territory may be identified based on the requested service time, service location, and/or service type. In some examples, a service duration associated with each of the occupied vehicles 110 is used to determine whether one or more occupied vehicles 110 are projected to become available before a predetermined threshold (e.g., before a pick-up time). If a vehicle 110 is projected to become available before the predetermined threshold, the vehicle 110 may be deemed available to service the service request 202. On the other hand, if the vehicle 110 is projected to become available at or after the predetermined threshold, the vehicle 110 may be deemed occupied or unavailable to service the service request 202.

Additionally or alternatively, a fuel level or vehicle range associated with each of the available vehicles 110 may be used to determine whether one or more available vehicles 110 are projected to service the service request 202 in an acceptable manner. For example, if a vehicle 110 is associated with a vehicle range less than a predetermined threshold (e.g., a projected travel distance), the vehicle 110 may be deemed unavailable to service the service request 202. In some examples, the service duration is determined and/or adjusted based on a fueling duration. The fueling duration may be determined based on a vehicle type, a fuel level, a route or travel distance between locations, and traffic conditions. EVs may take hours to fully recharge, for example, whereas hydrogen vehicles may take minutes to fully refuel. Additionally, a fueling time and/or fueling location for filling the vehicle 110 may be determined based on one or more fuel parameters 212. For example, fuel parameters 212, such as fuel prices at one or more filling stations 130 over a period of time, may be used to determine a fuel demand and/or one or more fuel price trends, and the fueling time and/or filing station location may be determined in light of the fuel demand and/or fuel price trends.

A first vehicle type corresponding to one of the operating costs 234 (e.g., a lower operating cost 234) is selected at operation 340. The first vehicle type may be associated with a first fuel type. For example, the first vehicle type may be a BEV, a FCEV, or a HEV. The first vehicle type may be selected, for example, based on a demand for services at that particular time (e.g., a quantity of service requests 202), a quantity of available vehicles 110 of each vehicle type, a fuel level of vehicles 110 of each vehicle type, a fueling duration, a demand on the power grid (e.g., first fuel source 142), a type of service request 202, a distance to a filling station 130, a travel distance to complete the current service, and/or a travel distance to begin the next service.

In some examples, a vehicle 110 of the first vehicle type is identified based on a vehicle status, a vehicle location, a fuel level, a vehicle range, and/or a traffic condition. One or more instructions may be provided to the identified vehicle 110 (e.g., at a remote device 242 associated with the identified vehicle 110) for managing the service request 202. Additionally or alternatively, one or more instructions may be provided to the service requester 204 (e.g., at a remote device 242 associated with the service requester 204).

Figure 4:
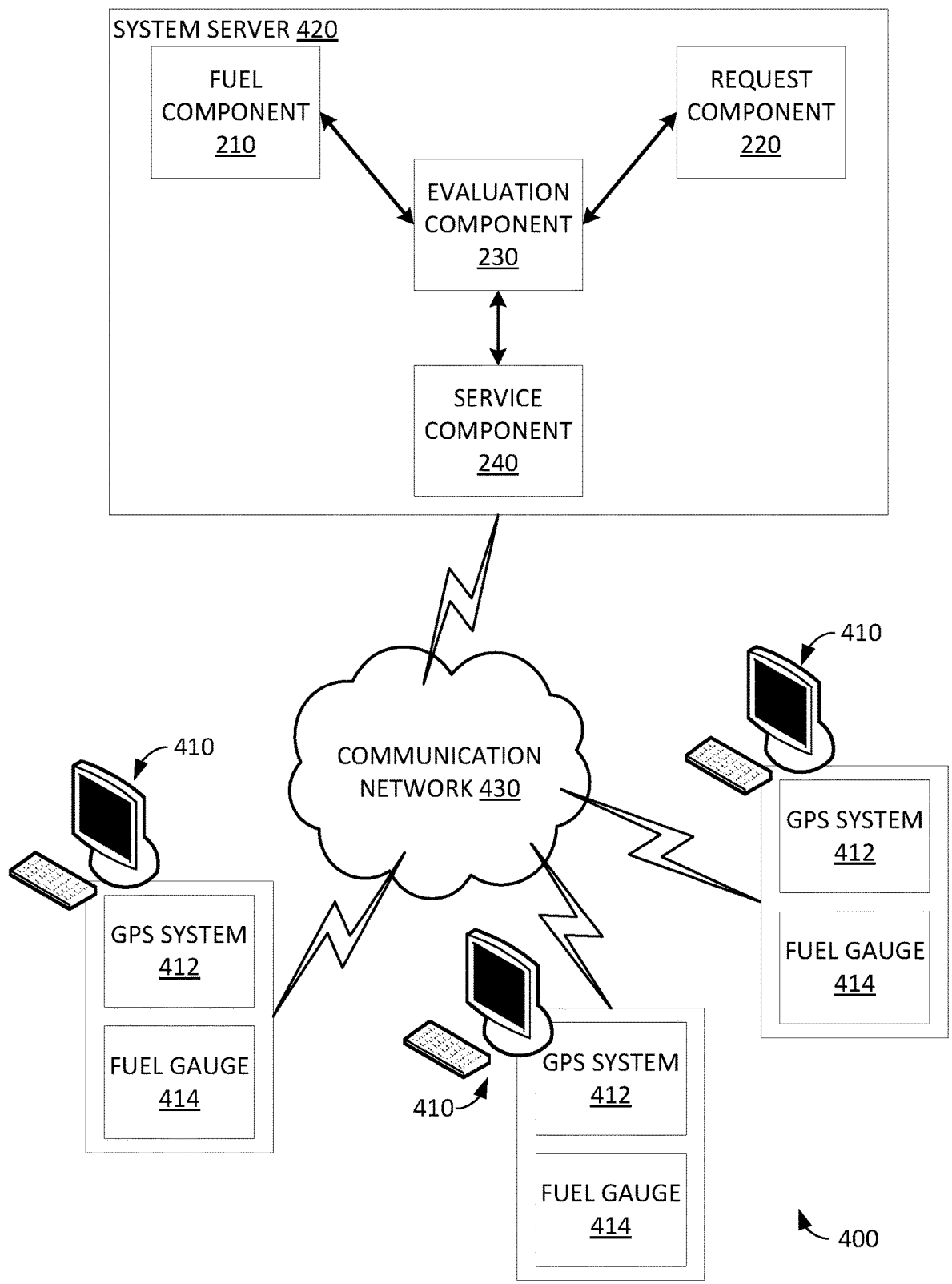
FIG. 4 includes a block diagram of an example cloud-based environment for managing a fleet using a system, such as the fleet management system shown in FIG. 2.

FIG. 4 shows an example cloud-based environment 400 including a plurality of computing devices 410 (e.g., remote device 242). One or more computing devices 410 (e.g., at vehicle 110) include a global positioning system (GPS) system 412 that identifies a vehicle location and/or traffic condition, and a fuel gauge 414 that identifies a fuel level and/or vehicle range. The computing devices 410 include one or more client-side applications that perform one or more operations at the computing devices 410 while one or more operations are performed remotely. For example, the client-side applications may allow the computing devices 410 to communicate with one or more computing systems (e.g., the "cloud") that perform one or more back-end operations using one or more counterpart applications (e.g., server-side applications) and/or through one or more server-side services. In some examples, the computing devices 410 transmit one or more signals associated with the GPS system 412 and/or fuel gauge 414 to a system server 420 (e.g., fleet management system 200) for back-end processing.

The system server 420 provides a shared pool of configurable computing resources to perform one or more back-end operations. The system server 420 may host or manage one or more server-side applications that include or are associated with fleet management technology, such as a GPS navigation application configured to provide navigation and traffic data and a resource management application configured to monitor fuel prices at one or more filling stations 130 over a period of time. The system server 420 may include or store data, such as fuel parameters 212, request parameters 222, service parameters 232, and/or operating costs 234. The data may be used, for example, to predict service demand, vehicle supply, routing information, service duration, fuel level, fueling duration, fueling time, fuel prices, and/or fuel demand. In some examples, the system server 420 includes a fuel component 210, a request component 220, an evaluation component 230, and a service component 240.

The cloud-based environment 400 includes one or more communication networks 430 that allow information to be communicated between a plurality of computing systems coupled to the communication networks 430 (e.g., computing devices 410, system server 420). Example communication networks 430 include, without limitation, a cellular network, the Internet, a personal area network (PAN), a local area network (LAN), and a wide area network (WAN). In some examples, the system server 420 includes, is included in, or is coupled to one or more artificial neural networks that "learn" and/or evolve based on information or insights gained through the processing of service requests 202, fuel parameters 212, request parameters 222, service parameters 232, and/or operating costs 234.

One or more interfaces (not shown) may facilitate communication within the cloud-based environment 400. The interfaces may include one or more gateways that allow the system server 420 and computing devices 410 to communicate with each other and/or with one or more other computing systems for performing one or more operations. For example, the gateways may format data and/or control one or more data exchanges using an Open Systems Interconnection (OSI) model that enables the computing systems (e.g., computing devices 410, system server 420) to communicate using one or more communication protocols. In some examples, the gateways identify and/or locate one or more target computing systems to selectively route data in and/or through the cloud-based environment 400.

Figure 5:
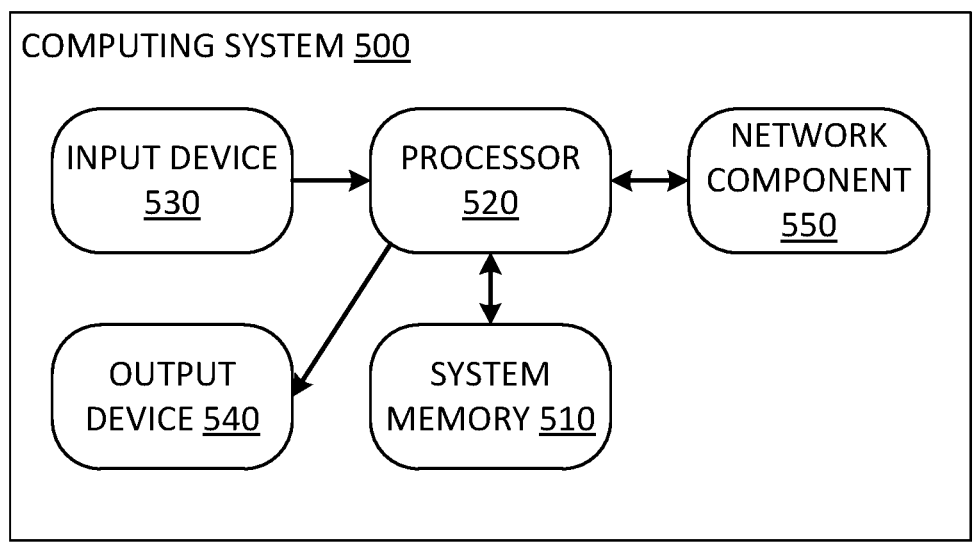
FIG. 5 includes a block diagram of an example computing system that may be used to manage a fleet using a system, such as the fleet management system shown in FIG. 2.

FIG. 5 shows an example computing system 500 configured to perform one or more computing operations. While some examples of the disclosure are illustrated and described herein with reference to the computing system 500 being included in a fleet management system 200 (shown in FIG. 2) and/or a system server 420 (shown in FIG. 4), aspects of the disclosure are operable with any computing system (e.g., remote device 242, computing devices 410) that executes instructions to implement the operations and functionality associated with the computing system 500. The computing system 500 shows only one example of a computing environment for performing one or more computing operations and is not intended to suggest any limitation as to the scope of use or functionality of the disclosure.

In some examples, the computing system 500 includes a system memory 510 (e.g., computer storage media) and a processor 520 coupled to the system memory 510. The processor 520 may include one or more processing units (e.g., in a multi-core configuration). Although the processor 520 is shown separate from the system memory 510, examples of the disclosure contemplate that the system memory 510 may be onboard the processor 520, such as in some embedded systems.

The system memory 510 stores data associated with one or more users, vehicles 110, filling stations 130, and/or service requesters 204, and computer-executable instructions, and the processor 520 is programmed or configured to execute the computer-executable instructions for implementing aspects of the disclosure using, for example, the fleet management system 200. For example, at least some data may be associated with one or more vehicles 110 (e.g., service parameters 232), filling stations 130 (e.g., fuel parameters 212), and/or service requesters 204 (e.g., request parameters 222), such that the computer-executable instructions enable the processor 520 to manage or control one or more operations of a vehicle 110 and/or fleet management system 200.

The system memory 510 includes one or more computer-readable media that allow information, such as the computer-executable instructions and other data, to be stored and/or retrieved by the processor 520. In some examples, the processor 520 executes the computer-executable instructions to identify a plurality of request parameters 222 associated with a service request 202, determine a plurality of operating costs 234 based on the request parameters 222, a plurality of service parameters 232, and/or one or more fuel parameters 212, and select a vehicle type corresponding to one of the operating costs 234.

By way of example, and not limitation, computer-readable media may include computer storage media and communication media. Computer storage media are tangible and mutually exclusive to communication media. For example, the system memory 510 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 520. Computer storage media are implemented in hardware and exclude carrier waves and propagated signals. That is, computer storage media for purposes of this disclosure are not signals per se.

A user or operator may enter commands and other input into the computing system 500 through one or more input devices 530 coupled to the processor 520. The input devices 530 are configured to receive information. Example input device 530 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 540 coupled to the processor 520. The output devices 540 are configured to convey information. Example, output devices 540 include, without limitation, a monitor, a projector, a printer, a speaker, a vibrating component. In some examples, an output device 540 is integrated with an input device 530 (e.g., a capacitive touch-screen panel, a controller including a vibrating component).

One or more network components 550 may be used to operate the computing system 500 in a networked environment using one or more logical connections. Logical connections include, for example, local area networks, wide area networks, and the Internet. The network components 550 allow the processor 520, for example, to convey information to and/or receive information from one or more remote devices, such as another computing system or one or more remote computer storage media. Network components 550 may include a network adapter, such as a wired or wireless network adapter or a wireless data transceiver.

Example systems and methods for managing fleets are described herein and illustrated in the accompanying drawings. For example, the automated fleet management system described herein is configured to manage a fleet of vehicles associated with a plurality of vehicle types. The examples described herein are able to project or estimate operating costs for servicing a requested service using a plurality of vehicles types and/or vehicles, and selects one of the vehicles types and/or vehicles to use for that particular requested service based on a comparison of the operating costs. Moreover, the examples described herein enable the strategic fueling of the vehicles. For example, the fleet management system may coordinate servicing and fueling decisions and/or operations to charge one or more batteries at lower fuel prices and discharge to the power grid at higher fuel prices. The servicing and/or fueling decisions and/or operations may also be coordinated to direct vehicles of a particular vehicle type to charge or discharge at a particular filling station and/or at a particular fueling time. Additionally, the servicing and/or fueling decisions may evolve based on information or insight gained over time, resulting in increased efficiency and/or accuracy. This written description uses examples to disclose aspects of the disclosure and also to enable a person skilled in the art to practice the aspects, including making or using the above-described systems and executing or performing the above-described methods.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, asset management.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fleet management system for managing a plurality of vehicles of a plurality of vehicle types in a cloud-based environment including a plurality of filling stations, each of the plurality of vehicles including one or more of a computing device, a global positioning system, and a fuel gauge, the plurality of vehicle types including at least a first vehicle type that includes a first vehicle using a first fuel type and a second vehicle type that includes a second vehicle using a second fuel type different from the first fuel type, wherein the plurality of filling stations includes a first filling station associated with the first fuel type and a second filling station associated with the second fuel type, the fleet management system comprising:
   a request component that, upon execution by one or more processors, receives one or more service requests from a service requester using one or more communication networks, and analyzes a first service request of the one or more service requests to identify a plurality of request parameters including one or more of a fueling time and a service territory;
   a fuel component that, upon execution by the one or more processors, communicates with one or more of the plurality of filling stations using the one or more communication networks, and identifies one or more fuel parameters associated with a plurality of fuel types including the first fuel type and the second fuel type;
   an evaluation component that, upon execution by the one or more processors, communicates with one or more of the plurality of vehicles using the one or more communication networks, identifies a plurality of service parameters including a vehicle location and a fuel level, and analyzes the plurality of service parameters in light of the plurality of request parameters and the one or more fuel parameters to determine a plurality of operating costs for managing the first service request using the one or more of the plurality of vehicles and the one or more of the plurality of filling stations, wherein the plurality of operating costs are associated with the plurality of fuel types, the vehicle location is identified using the global positioning system, and the fuel level is identified using the fuel gauge; and
   a service component that, upon execution by the one or more processors, analyzes the plurality of operating costs to select, from the plurality of operating costs, a first operating cost associated with the first fuel type, selects, from the plurality of vehicle types, the first vehicle type associated with the first fuel type, identifies, from the plurality of vehicles, the first vehicle associated with the first vehicle type, and communicates with the first vehicle using the one or more communication networks to selectively direct the first vehicle using the global positioning system to charge one or more batteries at the first filling station in the service territory at the fueling time.

2. The fleet management system of claim 1, wherein the fuel component is configured to identify a plurality of fuel prices at the one or more of the plurality of filling stations over a period of time, and determine one or more trends in the plurality of fuel prices.

3. The fleet management system of claim 1, wherein the request component is configured to identify a service time, and the evaluation component is configured to determine a service demand associated with the service territory at the identified service time.

4. The fleet management system of claim 1, wherein the request component is configured to identify a service time, and the evaluation component is configured to determine a vehicle supply associated with the service territory at the identified service time.

5. The fleet management system of claim 1, wherein the request component is configured to identify a service time, the fuel component is configured to identify a plurality of fuel prices at the one or more of the plurality of filling stations over a period of time, and the evaluation component is configured to determine a fuel demand associated with the service territory at the identified service time based on the plurality of fuel prices.

6. The fleet management system of claim 1, wherein the request component is configured to identify a service location, and the evaluation component is configured to determine a service duration based on the service location.

7. The fleet management system of claim 1, wherein the request component is configured to identify a service type, and the evaluation component is configured to identify, from the plurality of vehicles, one or more available vehicles in the service territory based on the service type.

8. The fleet management system of claim 1, wherein the evaluation component is configured to identify, from the plurality of vehicles, one or more available vehicles in the service territory.

9. The fleet management system of claim 1, wherein the evaluation component is configured to determine one or more fueling durations associated with the one or more vehicles of the plurality of vehicles.

10. The fleet management system of claim 1, wherein the service component is configured to transmit one or more instructions to the first vehicle of the plurality of vehicles for managing the first service request.

11. A computer-implemented method for managing a plurality of vehicles of a plurality of vehicle types in a cloud-based environment including a plurality of filling stations, each of the plurality of vehicles including one or more of a computing device, a global positioning system, and a fuel gauge, the plurality of vehicle types including at least a first vehicle type that includes a first vehicle using a first fuel type and a second vehicle type that includes a second vehicle using a second fuel type different from the first fuel type, wherein the plurality of filling stations includes a first filling station associated with the first fuel type and a second filling station associated with the second fuel type, the method comprising:
  communicating with a remote device over a communication network to receive a service request;
  analyzing the service request to identify a plurality of request parameters associated with the service request, the plurality of request parameters including one or more of a fueling time and a service territory;
  identifying one or more fuel parameters associated with a plurality of fuel types and a plurality of service parameters, the one or more fuel parameters including the first fuel type and the second fuel type, the plurality of service parameters including a vehicle location and a fuel level;
  determining a plurality of operating costs for managing the service request using the plurality of vehicles and the plurality of filling stations based on the plurality of request parameters, the plurality of service parameters, and the one or more fuel parameters associated with the plurality of fuel types, wherein the plurality of operating costs are associated with the plurality of fuel types, the vehicle location is identified using the global positioning system, and the fuel level is identified using the fuel gauge;
  analyzing the plurality of operating costs to select, from the plurality of operating costs, a first operating cost associated with the first fuel type of the plurality of fuel types;
  selecting, from the plurality of vehicle types, the first vehicle type associated with the first fuel type of the plurality of fuel types;
  identifying, from the plurality of vehicles, the first vehicle for managing the service request in the service territory at the fueling time, the first vehicle associated with the first vehicle type of the plurality of vehicle types; and
  communicating with the first vehicle over the communication network to selectively direct the first vehicle using the global positioning system to charge one or more batteries at the first filling station in the service territory at the fueling time.

12. The method of claim 11 further comprising:
identifying a plurality of fuel prices at one or more of the plurality of filling stations over a period of time;
determining one or more trends in the plurality of fuel prices; and
determining a fuel demand based on the one or more trends in the plurality of fuel prices.

13. The method of claim 11 further comprising:
identifying a service time; and
determining one or more of a service demand or a vehicle supply associated with the service territory at the service time.

14. The method of claim 11 further comprising:
identifying a service location; and
determining a service duration based on the service location.

15. The method of claim 11 further comprising:
identifying a service type;
identifying, from the plurality of vehicles, one or more available vehicles in the service territory based on the service type.

16. The method of claim 11 further comprising identifying, from the plurality of vehicles, one or more available vehicles in the service territory.

17. The method of claim 11 further comprising determining one or more fueling durations associated with one or more vehicles of the plurality of vehicles.

18. The method of claim 11 further comprising providing one or more instructions to the first vehicle of the plurality of vehicles for managing the service request.

19. A computing system for use in managing a plurality of vehicles of a plurality of vehicle types in a cloud-based environment including a plurality of filling stations, each of the plurality of vehicles including one or more of a computing device, a global positioning system, and a fuel gauge, the plurality of vehicle types including at least a first vehicle type that includes a first vehicle using a first fuel type and a second vehicle type that includes a second vehicle using a second fuel type different from the first fuel type, wherein the plurality of filling stations includes a first filling station associated with the first fuel type and a second filling station is associated with the second fuel type, the computing system comprising:
- one or more computer storage media including data associated with the plurality of vehicles and the plurality of filling stations, and computer-executable instructions; and
- one or more processors configured to execute the computer-executable instructions to:
  - receive a service request;
  - analyze the service request to identify a plurality of request parameters associated with the service request, the plurality of request parameters including one or more of a fueling time and a service territory;
  - identify one or more fuel parameters associated with a plurality of fuel types and a plurality of service parameters, the plurality of fuel types including the first fuel type and the second fuel type, the plurality of fuel types including a vehicle location and a fuel level;
  - determine a plurality of operating costs for managing the service request using the plurality of vehicles and the plurality of filling stations based on the plurality of request parameters, the plurality of service parameters, and the one or more fuel parameters, wherein the plurality of operating costs are associated with the plurality of fuel types, the vehicle location is identified using the global positioning system, and the fuel level is identified using the fuel gauge;
  - analyze the plurality of operating costs to select, from the plurality of operating costs, a first operating cost associated with the first fuel type of the plurality of fuel types;
  - select, from the plurality of vehicle types, the first vehicle type associated with the first fuel type of the plurality of fuel types;
  - identify, from the plurality of vehicles, the first vehicle for managing the service request in the service territory at the fueling time, the first vehicle associated with the first vehicle type of the plurality of vehicle types; and
  - selectively operate the first vehicle to charge one or more batteries at the first filling station of the plurality of filling stations in the service territory at the fueling time.

20. The computing system of claim 19, wherein the one or more processors are further configured to execute the computer-executable instructions to:
- identify a plurality of fuel prices at the plurality of filling stations over a period of time;
- determine one or more trends in the plurality of fuel prices;
- determine a fuel demand based on the one or more trends in the plurality of fuel prices; and
- determine one or more fueling durations associated with one or more vehicles of the plurality of vehicles.

* * * * *